Patented Aug. 10, 1948

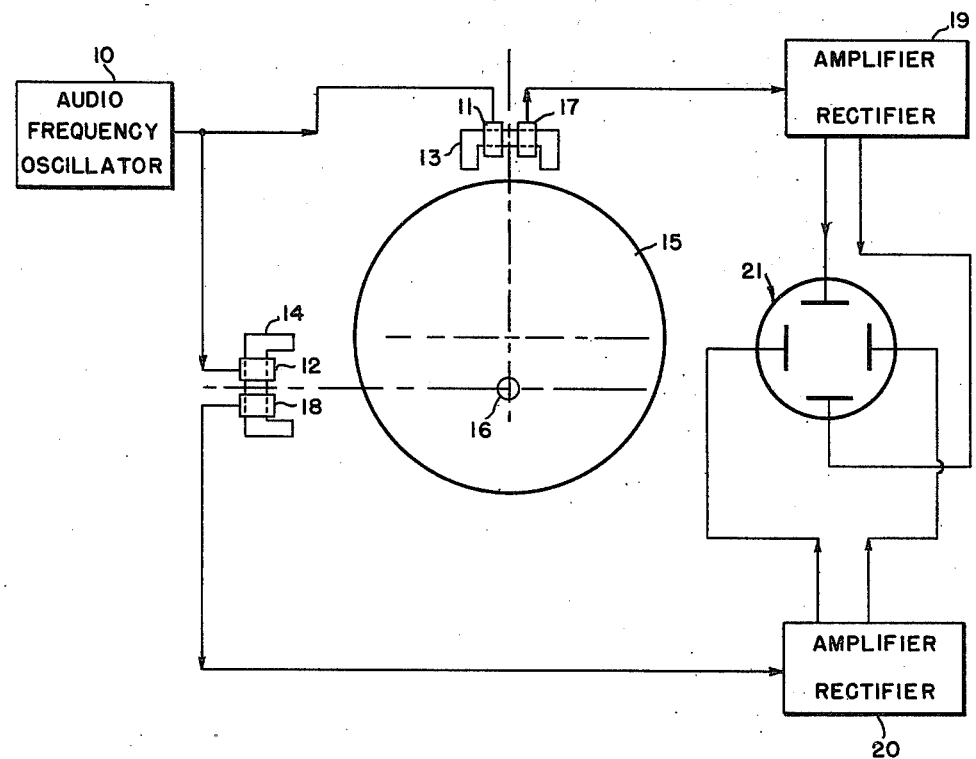

2,446,837

UNITED STATES PATENT OFFICE 2,446,837

MAGNETIC SWEEP GENERATOR

John D. Kraus, Newton Center, and Carlton A. Mizen, Needham Heights, Mass., assignors to United States of America as represented by the Secretary of War Application March 29, 1946, Serial No. 657,943

2 Claims. (Cl. 315—24)

This invention relates generally to electrical apparatus and more particularly to a magnetic sweep generator.

Often it is desirable to obtain a cathode ray tube presentation wherein the angular position of some rotatable structure is to be displayed simultaneously with other information. For example it may be required to present a cathode ray tube pattern which simultaneously indicates both the direction and magnitude of a received signal associated with a direction finding system. In such a presentation, the cathode ray tube would present an indication of the strength of the received signal and in addition, would indicate the angular position of the receiving antenna.

Such a presentation as described above has been accomplished in the prior art; however, the required apparatus is of a relatively complex type and is limited in its application.

A simple, dependable device for obtaining the above required presentation would find wide usage.

It is an object of the present invention to provide a cathode ray oscilloscope sweep circuit for presenting information regarding the angular position of a rotatable structure.

It is another object to provide a circular sweep for an electrostatic type cathode ray tube.

It is also an object to devise means for providing a simple, dependable, cathode ray tube presentation wherein the angular position of a rotatable structure may be displayed simultaneously with other associated information.

An oscilloscope sweep circuit which accomplishes the above objects consists of a cathode ray tube, an audio frequency amplifier, a rectifier, an audio frequency oscillator and a variable reluctance transformer. This variable reluctance transformer increases or decreases the amplitude of a sine wave voltage from an audio frequency oscillator in accordance with the angular position of a reference structure. The output voltages from this transformer are amplified and rectified and then applied to the four deflection plates of an electrostatic type cathode ray tube, to provide a circular sweep.

Other objects, features, and advantages of this invention will suggest themselves to those skilled in the art and will become apparent from the following description of the invention taken in connection with the single figure of the accompanying drawing which is a diagram, shown partially in schematic and partially by block diagram, of a circular sweep oscilloscope circuit embodying the principles of this invention.

Referring now to the drawing, an audio frequency oscillator 10 is connected to the primary windings 11 and 12 of iron cores 13 and 14 respectively of a variable reluctance transformer. Iron cores 13 and 14 are spaced 90° apart around the periphery of an eccentrically mounted ferromagnetic disc 15 which is rotated by shaft 16. Cores 13 and 14 are located equidistant from shaft 16. Secondary windings 17 and 18 are mounted on cores 13 and 14 respectively and are electrically connected to amplifier-rectifiers 19 and 20 respectively. The output of amplifier-rectifier 19 is electrically connected to the vertical deflection plates of cathode ray tube 21, and similarly, the output of amplifier-rectifier 20 is connected to the horizontal deflection plates of cathode ray tube 21.

By transformer action, a voltage is induced in secondary windings 17 and 18 due to the excitation of primary windings 11 and 12 respectively by audio frequency oscillator 10. The induced voltage in secondary winding 17 is amplified and rectified by amplifier-rectifier 19 and applied to the vertical deflection plates of cathode ray tube 21. Similarly, the induced voltage in secondary winding 18 is amplified and rectified by amplifier-rectifier 20 and applied to the horizontal deflection plates of cathode ray tube 21.

Iron cores 13 and 14 are mounted in close proximity to the periphery of disc 15, and the magnetic flux linkage between respective primary and secondary windings 11 and 17 and 12 and 18 is a function of the angular position of disc 15. Disc 15 is made of a ferromagnetic material and hence affects the reluctance of the magnetic flux path between the pole faces of the iron cores 13 and 14.

Thus the rotation of disc 15 produces a variation in the amplitude of the induced voltages in secondary windings 17 and 18 which are amplified and rectified and applied to the deflection plates of cathode ray tube 21. By suitably choosing the spacing of transformer cores 13 and 14 with respect to disc 15, the total change in reluctance of the transformer cores may be made small enough so that substantially linear operation is obtained and hence, the electron beam of cathode ray tube 21 will be deflected at an angular position proportional to the angular position of disc 15.

If a rectangular coordinate cathode ray tube presentation is desired, wherein the horizontal deflection of the cathode ray tube spot is proportional to the angular position of a rotatable structure, the system shown in the drawing can be modified to provide such a presentation by using a stepped cam instead of an eccentric disc. In this modified system, only one of the two identical channels which are shown in the drawing, would be required. The channel shown connected to the vertical deflection plates of the cathode ray tube would be replaced by amplifiers which supplied the new vertical deflection plate voltages.

While there has been here described what is at present considered to be the preferred embodiment of the invention, it will be obvious to those skilled in the art that various changes and modifications may be made therein without departing from the scope of the invention.

What is claimed is:

1. A magnetic eccentric disc sweep generator including a rotatable eccentrically mounted ferromagnetic disc, a first transformer with a primary and a secondary winding spaced near the periphery of said disc, a second transformer with a primary and a secondary winding spaced near the periphery of said disc and oriented in space about the axis of rotation of said disc 90 degrees from said first transformer, means for generating audio frequency voltage electrically connected to each of said primary windings, rectifier means electrically connected to each of said secondary windings, amplifier means electrically connecting the output of each of said rectifier means to the deflection plates of a cathode ray tube whereby the electron beam of said cathode ray tube is deflected at an angular position corresponding to the angular position of said eccentric disc.

2. A magnetic eccentric disc sweep circuit including a rotatable eccentrically mounted ferromagnetic disc, transformer means spaced near said disc so that the rotation of said disc varies the reluctance of the flux path of said transformer means, a source of audio frequency voltage connected to the primary windings of said transformer means, rectifier means electrically connected to the secondary windings of said transformer means and an electrostatic type cathode ray tube with its four deflection plates electrically connected to the output of said rectifier means whereby the electron beam of said cathode ray tube is deflected at an angle corresponding to the angular position of said disc.

JOHN D. KRAUS.
CARLTON A. MIZEN.

REFERENCES CITED

The following references are of record in the file of this patent:

UNITED STATES PATENTS

| Number | Name | Date |
|---|---|---|
| 2,401,175 | Morrill | May 28, 1946 |
| 2,410,317 | Tolson | Oct. 29, 1946 |
| 2,419,550 | Hardy | Apr. 29, 1947 |